(12) United States Patent
Eck et al.

(10) Patent No.: US 10,369,954 B2
(45) Date of Patent: Aug. 6, 2019

(54) DEVICE FOR SECURING A GAS GENERATOR IN AN AIRBAG MODULE IN AN OSCILLATING MANNER

(71) Applicant: TRW Automotive Safety Systems GmbH, Aschaffenburg (DE)

(72) Inventors: Gregor Eck, Kirchzell (DE); Constantin Von Roden, Karlstein (DE)

(73) Assignee: TRW AUTOMOTIVE SAFETY SYSTEMS GMBH, Aschaffenburg (DE)

( * ) Notice: Subject to any disclaimer, the term of this patent is extended or adjusted under 35 U.S.C. 154(b) by 33 days.

(21) Appl. No.: 15/520,427

(22) PCT Filed: Oct. 9, 2015

(86) PCT No.: PCT/EP2015/001991
§ 371 (c)(1),
(2) Date: Apr. 20, 2017

(87) PCT Pub. No.: WO2016/062379
PCT Pub. Date: Apr. 28, 2016

(65) Prior Publication Data
US 2017/0313275 A1 Nov. 2, 2017

(30) Foreign Application Priority Data
Oct. 23, 2014 (DE) .................... 20 2014 008 432 U

(51) Int. Cl.
*B60R 21/26* (2011.01)
*B60R 21/203* (2006.01)
(Continued)

(52) U.S. Cl.
CPC ........ *B60R 21/217* (2013.01); *B60R 21/2037* (2013.01); *B60R 21/26* (2013.01);
(Continued)

(58) Field of Classification Search
CPC ... B60R 21/2037; B60R 21/26; B60R 21/261; B60R 2021/2173; B60R 2021/2725
See application file for complete search history.

(56) References Cited

U.S. PATENT DOCUMENTS 3,037,150 A * 5/1962 Schriner .................. H02K 5/24
361/220
6,439,599 B1 8/2002 Laue et al.
(Continued)

FOREIGN PATENT DOCUMENTS

DE 102007049235 4/2009
DE 102008033201 1/2010
(Continued)

*Primary Examiner* — Drew J Brown
(74) *Attorney, Agent, or Firm* — Tarolli, Sundheim, Covell & Tummino LLP

(57) ABSTRACT

The invention relates to a device (18) for securing a gas generator (14) in an oscillating manner as a vibration-absorbing mass inside an airbag module (10). The invention is characterized in that a securing ring is provided for securing to the gas generator (14), said ring being open at least in sections in the radial direction by a continuous, radially outwardly directed annular gap and is provided with at least one axially oriented damping member.

26 Claims, 3 Drawing Sheets

US 10,369,954 B2
Page 2

(51) Int. Cl.
*B60R 21/217* (2011.01)
*B60R 21/261* (2011.01)
*B60R 21/272* (2006.01)

(52) U.S. Cl.
CPC .......... *B60R 21/261* (2013.01); *B60R 21/272* (2013.01); *B60R 2021/2173* (2013.01); *B60R 2021/2725* (2013.01)

(56) References Cited

U.S. PATENT DOCUMENTS

| | | | |
|---|---|---|---|
| 2001/0048216 A1* | 12/2001 | Varcus | B60R 21/2037 280/728.2 |
| 2002/0175500 A1* | 11/2002 | Heindl | B60R 21/2037 280/728.2 |
| 2003/0038459 A1* | 2/2003 | Leibach | B60R 21/2037 280/728.2 |
| 2006/0061068 A1* | 3/2006 | Nash | B60R 21/2037 280/728.2 |
| 2012/0139212 A1 | 6/2012 | Staudt | |
| 2013/0241181 A1 | 9/2013 | Faeth et al. | |
| 2013/0257024 A1* | 10/2013 | Iida | B60R 21/2035 280/728.2 |
| 2014/0299427 A1 | 10/2014 | Massanetz et al. | |
| 2017/0369021 A1* | 12/2017 | Kienzner | B60R 21/2037 |

FOREIGN PATENT DOCUMENTS

| | | |
|---|---|---|
| JP | 20060196217 | 4/2006 |
| JP | 102007049234 | 4/2009 |
| WO | 2005080146 | 1/2005 |

\* cited by examiner

DEVICE FOR SECURING A GAS
GENERATOR IN AN AIRBAG MODULE IN
AN OSCILLATING MANNER

RELATED APPLICATIONS

This application corresponds to PCT/EP2015/001991 filed Oct. 9, 2015, which claims the benefit of German Application No. 20 2014 008 432.7 filed Oct. 23, 2014, the subject matter of which are incorporated herein by reference in their entirety.

BACKGROUND OF THE INVENTION

The present invention relates to a device for securing a gas generator in an oscillating manner as a vibration-absorbing mass inside an airbag module. Furthermore, the present invention relates to an airbag module comprising such device for securing a gas generator in an oscillating manner as a vibration-absorbing mass inside the airbag module.

From EP 1 718 503 B1 a vibration-absorbing sealing for a gas generator of an airbag module as well as an airbag module equipped with such vibration-absorbing sealing for a vehicle steering wheel is known. Said vibration-absorbing sealing has a hollow-cylindrical shape and in the area of an inner surface facing the gas generator includes an annular groove of rectangular cross-sectional geometry in which an annular flange of the gas generator is received. The vibration-absorbing sealing is clamped between two housing parts of the airbag module and fixes and thus secures the gas generator in an oscillating manner as a vibration-absorbing mass inside the airbag module. The assembly of the vibration-absorbing sealing on the flange of the gas generator is intricate and complicated, however, and therefore is costly so that the assembly of the airbag module in total is equally costly. The vibration-absorbing sealing is adapted to be clamped and in this way fixed between the two housing parts of the airbag module. For this reason, the vibration-absorbing sealing according to EP 1 718 503 B1 especially includes no absorbing feet.

The solutions in prior art functioning with so-called absorbing feet or securing feet usually are constituted by at least two components. A first component is formed by a metallic annular reinforcing member which reinforces an elastic material so that despite the use of elastic securing feet (or absorbing feet, resp.,) a certain stability is achieved. In this context, by way of example DE 10 2009 030 601 A1 is referred to in which a gas generator is retained by a metallic annular retaining member, an elastic stop lip and elastic securing feet. An outer rim of the retaining member is mechanically re-formed so that a tight connection to a securing flange of the gas generator is brought about. In this context, the assembly and manufacture of the retaining device is felt to be comparatively complicated.

SUMMARY OF THE INVENTION

Therefore, it is an object of the invention to provide a device for securing a gas generator in an oscillating manner as a vibration-absorbing mass inside an airbag module by which simplified assembly of the airbag module can be enabled as well as a corresponding airbag module. Preferably manufacturing costs are to be reduced and nevertheless a comparatively efficient vibration absorption is to be achieved white maintaining comparatively high stability.

This object is achieved, according to a first aspect by a device for securing a gas generator in an oscillating manner as a vibration-absorbing mass inside an airbag module. A securing ring is provided for securing to the gas generator, said ring being open at least in sections in the radial direction by a continuous, radially outwardly directed annular gap and is provided with at least one axially oriented damping member.

In this way, the vibration-absorbing device can be easily and quickly secured to the gas generator by the securing ring by slightly radially widening the same.

Especially by the combination of at least one axially oriented damping member (especially absorbing foot) together with the annular gap easy assembly can be ensured with simultaneously efficient damping and sufficient stability.

The object is achieved, according to a second aspect (which may be combined with the first aspect), by a device for securing a gas generator in an oscillating manner as a vibration-absorbing mass inside an airbag module, wherein a securing ring is provided for securing to the gas generator, the securing ring being provided with at least one axially oriented damping member and at least 90 percent by weight of the securing ring being made from a (preferably exactly one) elastic material, especially elastomer. Under the second aspect, the securing ring may also be designed to be continuous (i.e. to have no annular gap). Preferably, at least 95 percent by weight or at least 99 percent by weight of the securing ring may be made from elastic material in a concrete embodiment, the securing ring is completely made from elastic material.

A central idea of the second aspect resides in providing a securing ring in which at least one axially oriented damping member is provided (especially absorbing foot) and in simultaneously manufacturing the securing ring (at least mostly) of elastic material. Heavy metal inserts which are complicated as regards the assembly can be dispensed with in a surprisingly simple manner. In accordance with the invention, it has been found that the seeming drawbacks of an elastic material, especially the low stability, can be overcome by exploiting the elasticity of the material so that the securing ring can be easily mounted and can safely retain the gas generator. Especially, in such constructively simple solution a retaining force can be realized which is comparable to the retaining force of the axial damping member (especially absorbing foot) so that in the case of release of an airbag no deterioration will occur. In total, by the second aspect easy assembly with simultaneously comparatively high efficiency of the damping and sufficient stability as well as retaining force is realized.

Basically, the securing ring may be formed from plural elastic materials. In a concrete embodiment, the securing ring is formed monolithically, i.e. of only one elastic material, especially elastomer. Such embodiment can be especially simple in manufacture. A comparatively cost-efficient securing ring can be manufactured without an additional component (such as a reinforcing insert of metal) being required. Also, tool costs are lower. Finally, the mounting of the securing ring on the gas generator is facilitated as well. Moreover, recycling is facilitated as compared to prior art. The simple design also helps to reduce the space required.

In a concrete embodiment, the securing ring has a recess for receiving a flange of the gas generator so that the securing ring is stabilized by the flange. In such further development, the fact that the gas generator (and thus also the flange thereof) is made from comparatively stable material is synergistically utilized. In particular, the tact that the gas generator itself may contribute to its stable support will be utilized. Especially a safe and stable support of the gas generator is facilitated in a constructively simple manner.

In a preferred embodiment, the securing ring comprises a U-profile. A first leg of the U-profile (on which the flange of the gas generator rests) is preferably longer than a second leg of the U-profile. In total, a simple design may allow for a safe support of the gas generator. Especially in combination with the idea of forming the securing ring of an elastic material, on the one hand, the shorter second leg of the U-profile may be used as a mounting portion over which the elastic securing ring can be slipped. At the same time, however, a longer leg is provided so that the gas generator rests in a stable manner and thus also a stable overall design is obtained. The first leg may preferably be at least 1.2 times, further preferred at least 1.5 times, even further preferred at least 2 times the length of the first leg.

The shorter leg of the U-profile more preferably has a beveled edge so that during assembly the flange of the gas generator can be guided past the shorter leg in a comparatively simple manner until it engages in the recess of the securing ring.

The securing ring may be formed without any reinforcing insert. Alternatively or additionally, metal and/or non-elastic plastic material is dispensed with.

In a further development, the securing ring comprises a connecting means for bridging the annular gap. Thus, the securing ring can be easily stabilized after connection to the gas generator.

The device preferably includes at least one recess, especially at least two recesses disposed on both sides of the gap for receiving at least one clip. Alternatively or in addition, the connecting means may include at least one clip. In a concrete embodiment, the connecting means includes a hinge, especially a film hinge, which is preferably injection-molded to the securing ring. In another embodiment, the connecting means comprises a pin, preferably on the hinge, which engages in a corresponding recess for closing the connection. Stable positioning of the securing ring and the gas generator is achieved by such measures in a constructively simple manner.

According to one embodiment, the securing ring is at least substantially circular ring-shaped and includes at least in portions an outer rim on which at least in sections a radially inwardly directed projection is formed so as to enable the gas generator to be secured in position on the securing ring.

In this way, a reliable securing of an associated gas generator in position in the securing ring is given when the annular gap is closed.

Preferably, the outer rim and the projection exhibit dimensions formed for enabling an arrangement of an at least approximately circular ring-shaped, radially outwardly directed flange of the gas generator inside the outer rim and in the area between an upper side of the securing ring and the projection.

In this way, an associated gas generator may be secured in position inside the securing ring in the radial and axial directions.

According to one embodiment, on the upper side of the securing ring a connecting member divided by the annular gap is provided.

The connecting member allows for quick connection of the ring ends and, where necessary, also for easy separation thereof.

Preferably, the connecting member is configured to positively engage, when the annular gap is closed, at least in sections in an opening provided in the flange of the gas generator for locking two ring ends and for clamping the gas generator inside the securing ring.

In this way, both ends of the divided securing ring are connected in a mechanically reliable, especially permanently vibration-resistant manner, wherein the securing ring can be fixed at the same time with a defined radial pretension on the gas generator for securing the latter.

The connecting member preferably includes an undercut, especially a peripheral groove, on en axial end facing the upper side of the securing ring.

In this way, the connecting member can be locked with the opening in the flange of an associated gas generator when the securing ring is closed. On a longitudinal side of a groove, at least in portions a thickening may be provided.

On the upper side of the securing ring (especially also in a gap-free design) a positioning projection, especially a positioning lip, may be arranged so that the positioning projection can interact with a recess or opening on the gas generator, especially a flange of the gas generator, for fixing a relative position between the gas generator and the securing ring. This enables stabilization of the gas generator and of the securing ring in a simple manner.

According to another embodiment, the at least one damping member is arranged on an underside of the securing ring.

In this way, uncoupling in terms of oscillations is performed between the gas generator and the generator support.

The securing ring (especially the damping member thereof) may include plastic and/or elastomer, especially a rubber material or silicone. Alternatively or additionally, a maximum E-modulus value of the securing ring, especially of the damping member, is less than 1 GPa, preferably 0.5 GPa, further preferred 0.1 GPa. A "maximum" E-modulus is understood to be an E-modulus of the elastic material having the highest E-modulus. In a monolithic design of only one material the "maximum" E-modulus value at the same time then is the present single E-modulus. In the case of such material an efficient damping can be obtained with still high stability.

When using plastic material, the securing ring can be manufactured at low cost and with high dimensional stability in mass production e.g. in one piece by injection molding. Moreover, low weight of the securing ring can be realized with a simultaneously complex shaping.

When elastomer, especially rubber or silicone, is used, an excellent and long-term stable vibration damping effect is given. Apart from that, elastomers may be easily processed together with thermoplastic materials in so-called co-injection molding processes. By suited selection of the elastomer moreover the vibration damping behavior of the device can be specifically influenced.

Preferably the connecting member and the at least one damping member are formed integrally with and especially injection-molded to the securing ring.

Accordingly, the manufacture of the securing ring including the connecting member and the damping member as well as appropriate assembly can be facilitated. Alternatively, the connecting member and the damping member can be separate components which are joined with the securing ring in a suitable manner.

According to one embodiment, each of the at least one connecting member associated with the securing ring and the at least one damping member associated with the securing ring is formed at least substantially pin-shaped and includes a circular, elliptic, oval or at least triangular cross-sectional geometry with rounded edges.

Due to said shaping, a reliable mechanical connection of the two ring ends as well as a sufficiently loadable vibrationdamped mechanical coupling of the securing ring including the gas generator received therein to another component of the airbag module, such as a generator support in the form of a retaining sheet etc., is given.

According to a further embodiment, the at least one damping member includes at least one undercut, especially a peripheral groove, for securing to an associated component, especially a generator support.

Accordingly, the securing ring can be easily and quickly secured to the associated component such as e.g. a retaining plate, a retaining sheet or the like. A thickening may be provided at least in portions on at least one longitudinal side of a groove.

The afore-described object is further achieved by an airbag module comprising a gas generator and a device for securing in an oscillating manner of the afore-described type. The gas generator preferably includes a flange, wherein, further preferred, the flange is arranged in a corresponding, especially annular, recess of the securing ring, in concrete embodiments, the flange can be inserted in the corresponding recess. Alternatively or additionally, the securing ring may be injection-molded to the flange. In the mounted state, the securing ring may be stretched so that a tensioning force is applied to the flange for fixing the same.

In general, an airbag module can be provided which is easy end straightforward to manufacture and, resp., to assemble, wherein the vibration-damping device including the securing ring can be easily and quickly secured to the gas generator by slightly radially widening the securing ring.

Especially, by dropping the hard component (sheet metal) used in prior art a securing ring (absorbing ring) is realized which per se is comparatively unstable and deformable. The (seeming) drawback of instability may be compensated, however, by the fact that the gas generator, especially the flange thereof is used as support and, resp., stabilizing element of the securing ring. Said stabilizing (stiffening) function is sufficient to maintain the securing ring (absorbing ring) in position. The deformability may even be advantageously utilized to fix the gas generator on the securing ring (absorbing ring).

The ring may be basically closed and at the periphery of the gas generator may enclose the flange thereof positively, e.g. by a profile. The elasticity of the securing ring helps to widen and to mount the latter on the flange of the gas generator. During possible relief of the securing ring the flange of the gas generator may engage in the securing ring (e.g. the profile or U-profile thereof) and stabilize the latter. Where appropriate, the securing ring can be designed so that the flange of the gas generator is still fixed by the residual tension force of the securing ring. A retaining force to be expected can be comparable to the retaining force of axial damping members (absorbing feet) so that in the case of airbag release no deterioration will occur. The securing ring (absorbing ring) can be positioned by an elastic nipple passing through an opened area.

A connection between the gas generator and the securing ring is preferably positive.

The securing ring (absorbing ring) may be (directly) infection-molded onto the flange of the gas generator or may be vulcanized onto the same. Alternatively or additionally, a bonded connection is possible, too.

BRIEF DESCRIPTION OF THE DRAWINGS

Further details and advantageous further developments of the invention will be evident from the embodiments described in the following and shown in the drawings which are by no means understood to limit the invention, wherein.

DESCRIPTION

Figure 1:
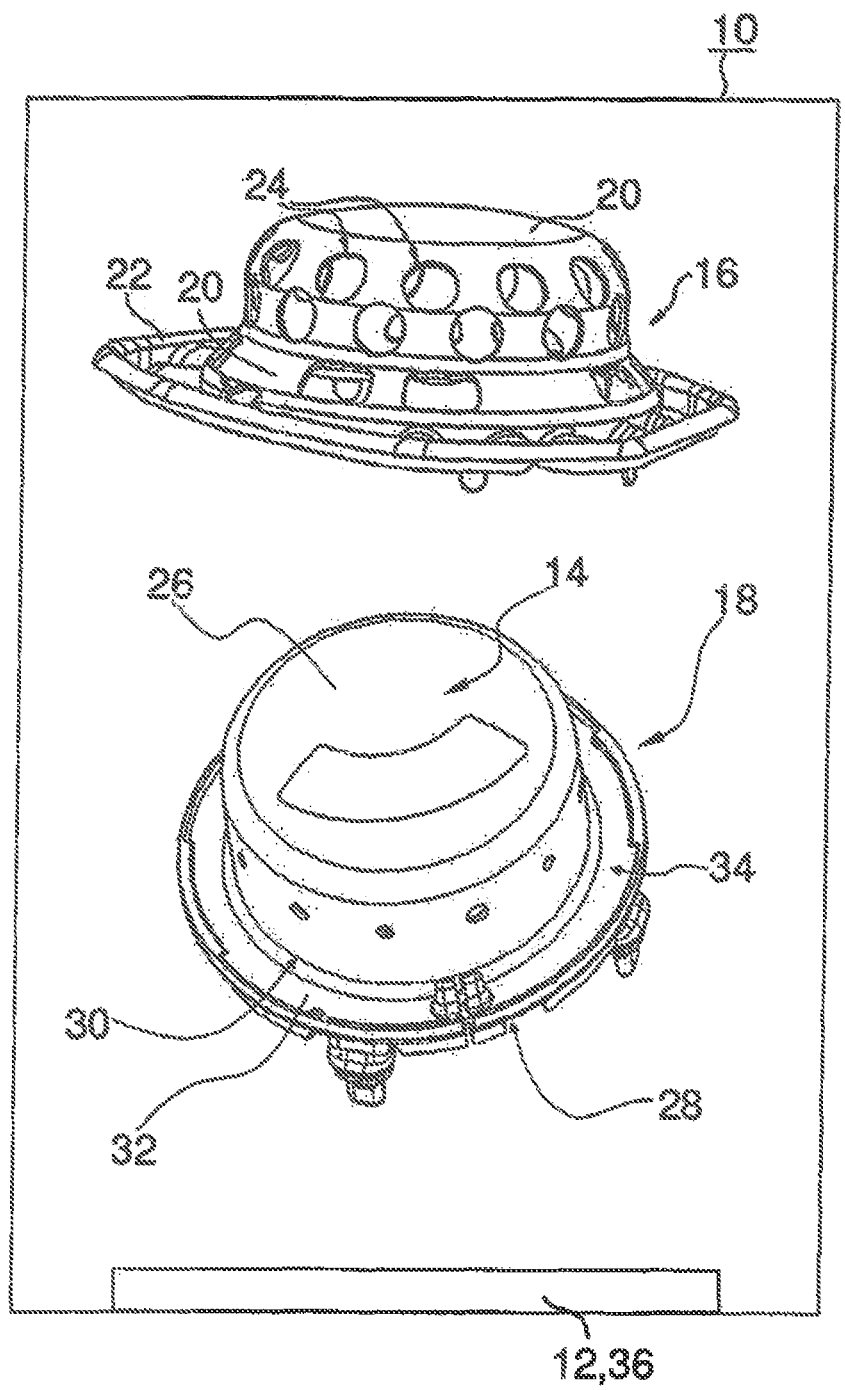
FIG. 1 is a schematic partially perspective view of an airbag module comprising a gas generator and a device for securing a gas generator in an oscillating manner inside an airbag module according to an embodiment.

In the following description the terms left, right, front, rear, top and bottom refer to the respective figure in the drawing and may vary depending on a respective selected orientation (portrait format or landscape format) from one drawing figure to the next. Like or equally acting parts are denoted in the various figures with like reference numerals and are usually described only once.

FIG. 1 shows an exemplary airbag module 10 for a vehicle steering wheel according to one embodiment. The airbag module 10 illustrates a generator support 12, a gas generator 14, a diffusor 18 as well as a device 18 for securing the gas generator 14 in an oscillating manner as a vibration-absorbing mass inside the airbag module 10. It is pointed out, however, that the airbag module 10 and the generator support 12 are represented only schematically for the purpose of clarity of the drawing, whereas the other components are depicted in perspective.

The diffusor 16 is preferably hat-shaped and illustratively includes an inversely cup-shaped outer wall 20 whose end open to the bottom in FIG. 1 is provided with a flange-type expansion 22 in the way of a hat brim. The diffusor 16 is preferably designed like a common diffusor known from prior art and includes a plurality of discharge openings 24 only two openings of which are marked by way of example in FIG. 1 for the purpose of clarity of the drawing.

The gas generator 14, which may be realized e.g. by a gas generator known from prior art, includes a housing 28 by way of example inversely pot-shaped having an approximately circular bottom 28 which is transformed via an outer periphery 30 into a flange-type or collar-type circular ring-shaped expansion 32 hereinafter referred to as flange. Said expansion is formed on an axial end portion 34 of the housing 26 forming a bottom side of the gas generator 14 in FIG. 1.

According to one embodiment, the gas generator 14 is secured to an associated component 36 by means of the vibration-absorbing device 18. Said component preferably is the generator support 12 of the airbag module 10.

Figure 2:
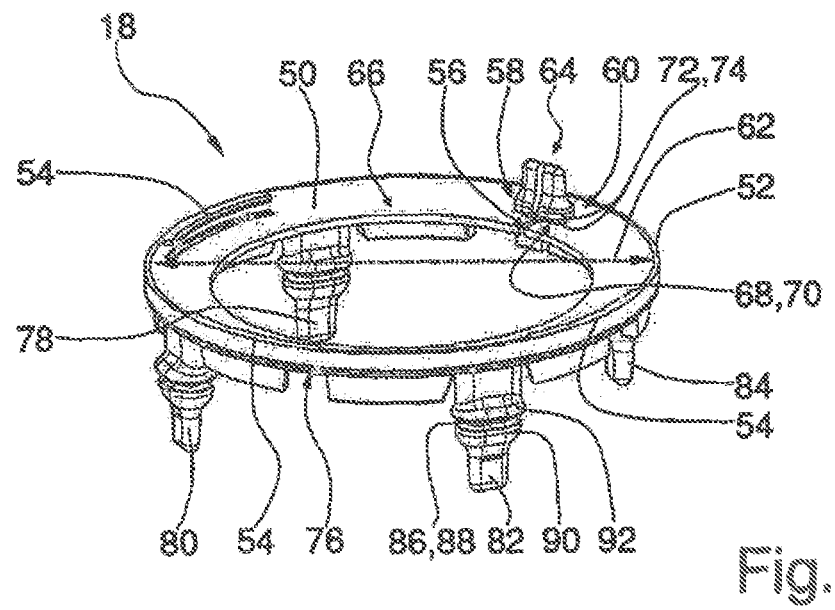
FIG. 2 is a perspective view of the device for securing the gas generator in an oscillating manner inside the airbag module of FIG. 1.

FIG. 2 illustrates the device 18 of FIG. 1 which, according to one embodiment, is configured for securing the gas generator 14 of FIG. 1 in an oscillating and especially vibration-absorbed manner to the associated component 36 and, resp., the generator support 12 of the airbag module 10 of FIG. 1. For this purpose, the device 18 preferably includes an at least substantially annular, especially circular ring-shaped securing ring 50 having an outer rim 52 which is peripheral at least in portions. At least one radially inwardly oriented projection 54 is formed on said outer rim 52.

The securing ring 50 preferably includes an approximately rectangular cross-sectional geometry and is formed with thermoplastic or thermosetting materials. According to one embodiment, the securing ring 50 is opened by a continuous radially outwardly directed annular gap 56 creating two ring ends 58, wherein in the idle state of the securing ring 50 with an open annular gap 56 preferably a predetermined inner diameter 82 of the outer rim 52 will form due to the radial inherent resilience of the securing ring 50. A pin-shaped connecting member 64 divided by the annular gap 56 is provided in the area of an upper side 66 of the securing ring 50.

The connecting member 64 includes, merely by way of example in this case, a substantially oval cross-sectional geometry in this case, but, deviating herefrom, it may also have a circular, an elliptic or an at least triangular cross-sectional geometry having rounded edges. Moreover, due to the annular gap 56 the connecting member 64 is separated, merely for illustration purposes in this case, equally into two partial pins each of which has an approximately semi-oval cross-sectional geometry and is not marked for the purpose of clarity of the drawing. However, said partial pins may as well take shapes deviating herefrom and also differing from each other.

At an axial end 66 facing the upper side 66 of the securing ring 50 the connecting member 64 preferably includes an undercut 70 realized in the kind of a peripheral groove or annular groove 72. Along a longitudinal side of the annular groove 72, which is not denoted and extends in parallel to the upper side 66 of the securing ring 50, a thickening 74 is formed.

In the area of an underside 76 of the securing ring 50 four axially oriented damping members 78 to 84 are exemplified to be integrally formed, each, by way of example, exhibiting a substantially oval cross-sectional geometry. Deviating herefrom, the damping members 78 to 84 may also include a circular, elliptic or at least triangular cross-sectional geometry having rounded edges. The damping members 78 to 84 as well as the connecting member 64 are preferably configured to comprise an elastomer, especially a rubber mixture, a silicone or the like and are formed integrally with the securing ring 50, i.e. are especially injection-molded to the latter.

It is outlined, however, that basically any number of axially oriented damping members 78 to 84 may be provided, preferably however at least one damping member. Moreover, alternatively or additionally to the axially oriented damping members 78 to 84, e.g. also radially oriented damping members may be applied.

Each of the damping members 78 to 84 includes an undercut which is preferably realized as a peripheral groove or annular groove. On both sides of each annular groove a thickening is provided. By way of example, only one undercut and, resp., one annular groove 38 including the pertinent thickened portions 90, 92 of the foremost damping member 82 out of the undercuts and, resp., the annular grooves and the pertinent thickened portions is marked in FIG. 2 for the purpose of clarity of the drawing. The undercuts and, resp., the grooves provided at the damping members 78 to 84 enable the securing ring 50 to be easily secured in associated openings of the associated component 36 and, resp., the generator support 12 of the airbag module 10 of FIG. 1.

Figure 3:
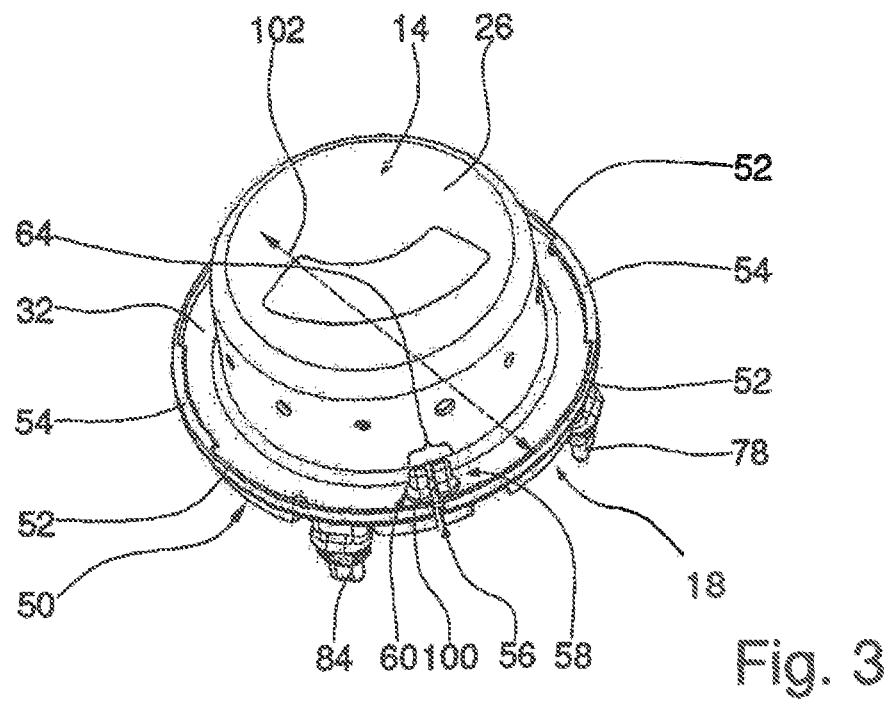
FIG. 3 is a perspective view of the gas generator of FIG. 1 inserted in the device of FIG. 2.

FIG. 3 illustrates the gas generator 14 of FIG. 1 secured to the device 18 of FIGS. 1 and 2, wherein the circular ring-shaped flange 32 thereof of the housing 26 according to one embodiment is comprised on all sides by the outer rim 52 of the securing ring 50 of the device 18, thus allowing preferably at least one radial securing of the flange 32 in position at the securing ring 50 to be given. Moreover, the flange 32 is received between the projection 54 provided at least in portions on the outer rim 52 of the securing ring 50 and the upper side 66 of FIG. 2 of the securing ring 50 covered in this case and is thus secured in position on the same also in the radial direction.

Both ring ends 58, 60 of the securing ring 50 are moreover latched to each other by means of the pin-shaped connecting member 64 of the device 18 which is preferably positively received, at least in sections, in an exemplified oval opening 100 here. For this purpose, a cross-sectional geometry of the connecting member 64 in this area corresponds most largely to a peripheral geometry of the opening 100. In order to achieve an especially reliable latching of the two ring ends 58, 60, an edge of the opening 100 which is not denoted is located within the peripheral groove or annular groove 72 of the connecting member 64 (cf. FIG. 2).

According to one embodiment, an inner diameter 82 of FIG. 2 of the securing ring 50 in the relieved state—i.e. with an open annular gap 56—is dimensioned in proportion to an outer diameter 102 of the housing 26 of the gas generator 14 so that, when the connecting member 64 is inserted in the opening 100, the securing ring 50 contracts radially around the gas generator 14 and, resp., around the flange 32 thereof of FIG. 1. Thus, the latter is braced with the securing ring 50 at a defined radial pre-tension and, in this way, can be supported and, resp., secured by the same in an oscillating manner in the airbag module 10 of FIG. 1. Moreover, a space between the upper side 66 of FIG. 2 of the securing ring 50 and the projections 54 of the outer rim 52 relative to a material thickness of the flange 32 of the gas generator 14 is preferably dimensioned so that the latter is safely accommodated inside the securing member 50 with an at least largely and preferably completely closed annular gap 56 even in the axial direction while being slightly axially pre-tensioned.

This results in a preferably lifelong and vibration-resistant mechanical connection of the gas generator 14 to the securing ring 60 so that reliable operation of the airbag module 10 of FIG. 1 will be ensured in all practically relevant operating conditions of a respective motor vehicle. At the same time, in terms of manufacture the securing ring 50 can be secured to and, where necessary, released from the gas generator 14 easily, quickly and without using any tools.

Figure 4:
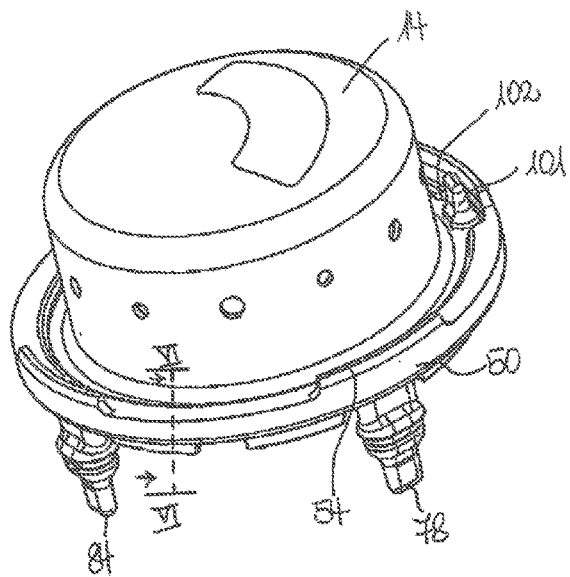
FIG. 4 is a schematic perspective view of an alternative embodiment of an airbag module comprising a gas generator and a device for securing the gas generator in an oscillating manner inside the airbag module.
Figure 6:
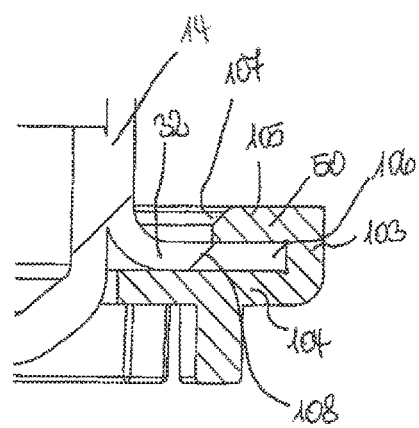
FIG. 6 is a cutout of a section across the airbag module according to the sectional line VI-VI in FIG. 4.
Figure 5:
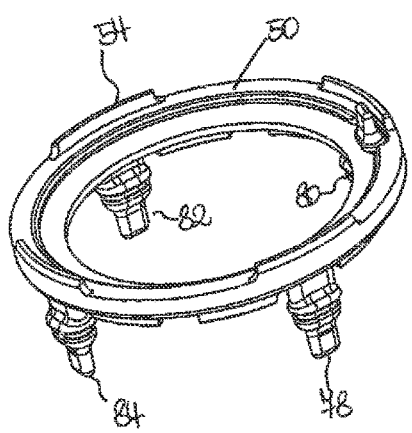
FIG. 5 is a schematic perspective view of a securing ring of the embodiment according to FIG. 4.

FIGS. 4 to 6 illustrate a second embodiment of the airbag module according to the invention. The gas generator 14 is structured (at least substantially) just as the gas generator 14 according to the embodiment of the FIGS. 1 to 3. The securing ring 50 is different from the securing ring according to the embodiment of FIGS. 1 to 3, however. Especially, the securing ring 50 according to FIGS. 4 to 6 is continuously formed, i.e. it has no annular gap. Instead of the connecting member 64, a positioning nipple 101 is provided which together with a recess 102 of the gas generator 14 permits a clearly defined positioning of the securing ring vis-à-vis the gas generator 14.

Furthermore, the securing ring 50 has a U-profile 103 (of FIG. 6) comprising a first leg 104 and a second leg 105. The first leg 104 is longer than the second leg 105. Moreover, the flange 32 of the gas generator rests on the first leg 104. Further, a recess 106 in which the flange 32 is received is defined by the U-profile 103. The second leg 105 has an inclined surface 107 so that the flange 32 (with a corresponding inclined surface 108) can be guided past the second leg 105 during assembly and can be received in the recess 106.

Naturally, within the scope of the present invention multiple changes and modifications are possible.

The invention claimed is:

1. A device (18) for securing a gas generator (14) in an oscillating manner as a vibration-absorbing mass inside an airbag module (10), wherein a securing ring (50) is provided for securing to the gas generator (14), the securing ring (50) being provided with at least one axially oriented damping member (78, 80, 82, 84) and being completely divided by a continuous, radially outwardly directed annular gap (56) so that the securing ring (50) has a ring end (58, 60) on each side of the annular gap (56).

2. The device (18) according to claim 1, wherein at least 90% by weight of the securing ring (50) is made from elastic material.

3. The device (18) according to claim 1, wherein the securing ring (50) is formed monolithically, from only one elastic material.

4. The device (18) according to claim 1, wherein the securing ring (50) includes no reinforcing insert and/or no metal and/or no non-elastic plastic material.

5. The device (18) according to claim 1, wherein the securing ring (50) includes a connecting means for bridging the annular gap (56).

6. The device (18) according to claim 5, wherein the connecting means includes at least one clip and/or at least one recess, disposed on at least one side of the annular gap (56), for receiving at least one clip.

7. The device (18) according to claim 5, wherein the connecting means includes a hinge injection-molded to the securing ring (50).

8. The device (18) according to claim 5, wherein the connecting means includes a pin, provided on the hinge, which pin engages in a corresponding recess for closing the connection.

9. The device (18) according to claim 1, wherein the securing ring (50) is formed to be at least substantially circular ring-shaped and at least in portions includes an outer rim (52) on which at least in sections a radially inwardly directed projection (54) is formed so as to enable the gas generator (14) to be secured in position on the securing ring (50), wherein the outer rim (52) and the projection (54) have dimensions which are configured to enable an arrangement of an at least approximately circular ring-shaped, radially outwardly directed flange (32) of the gas generator (14) inside the outer rim (52) and in the area between an upper side (66) of the securing ring (50) and the projection (54).

10. The device (18) according to claim 1, wherein on the upper side (66) of the securing ring (50) a connecting member (64) divided by the annular gap (56) is provided, wherein the connecting member (64) is configured to positively engage, with the annular gap (56) being closed, at least in sections in a recess or opening (100) provided in the flange (32) of the gas generator (14) for locking the two ring ends (58, 60) and/or for clamping the gas generator (14) inside the securing ring (50) and/or wherein the connecting member (64) includes an undercut (70 and/or a peripheral groove (72) at an axial end (68) facing the upper side (66) of the securing ring (50).

11. The device (18) according to claim 10, wherein at least one of the securing ring (50), the damping member (78, 80, 82, 84), and the connecting member (64) includes at least one of plastic material, an elastomer, a rubber material, and silicone.

12. The device (18) according to claim 10, wherein a maximum E-modulus of at least one of the securing ring (50), the damping member (78, 80, 82, 84), and the connecting member (64) is less than 1 GPa.

13. The device (18) according to claim 10, wherein the connecting member (64) and/or the at least one damping member (78, 80, 82, 84) is formed integrally with the securing ring (50).

14. The device (18) according to claim 10, wherein the connecting member (64) associated with the securing ring (50) and/or the at least one damping member (78, 80, 82, 84) associated with the securing ring (50) are at least substantially pin-shaped and have a circular, an elliptic, an oval or an at least triangular cross-sectional geometry including rounded edges.

15. The device (18) according to claim 1, wherein the at least one damping member (78, 80, 82, 84) is arranged on an underside (76) of the securing ring (50).

16. The device (18) according to claim 1, wherein at least one damping member (78, 80, 82, 84) includes at least one undercut (86 and/or at least one peripheral groove (88) for securing to an associated component (36).

17. An airbag module (10) comprising a gas generator (14) as well as a device (18) for securing a gas generator (14) in an oscillating manner as a vibration-absorbing mass inside the airbag module (10) according to claim 1.

18. The airbag module (10) according to claim 17, wherein the gas generator (14) includes a flange (32) and the securing ring (50) is injection-molded to the flange (32).

19. A device (18) for securing a gas generator (14) in an oscillating manner as a vibration-absorbing mass inside an airbag module (10), wherein a continuous securing ring (50) is provided for securing to the gas generator (14), the securing ring (50) including a recess (106) for receiving a flange (32) of the gas generator (14) so that the securing ring (50) is stabilized by the flange (32), the securing ring (50) being provided with at least one axially oriented damping member (78, 80, 82, 84) that is arranged on an underside (76) of the securing ring (50).

20. The device according to claim 19, wherein the securing ring (50) comprises a U-profile (103), wherein a first leg (104) of the U-profile (103), on which a flange (32) of the gas generator (14) rests, is longer than a second leg (105) of the U-profile (103).

21. The device according to claim 19, wherein on an upper side (66) of the securing ring (50), a positioning nipple (101) is arranged so that the positioning nipple (101) can interact with a recess (102) or an opening of the gas generator (14) for fixing a relative position between the gas generator (14) and the securing ring (50).

22. An airbag module (10) comprising a gas generator (14) as well as the device (18) for securing a gas generator (14) in an oscillating manner as a vibration-absorbing mass inside the airbag module (10) according to claim 19.

23. The airbag module according to claim 22, wherein the gas generator (14) includes a flange (32), wherein the flange (32) is arranged in the recess (106) of the securing ring (50).

24. The airbag module according to claim 23, wherein the flange (32) is inserted in the recess (106) of the securing ring (50) which, in the assembled state, is stretched so that tension force is applied to the flange (32) for fixing the same.

25. A device (18) for securing a gas generator (14) in an oscillating manner as a vibration-absorbing mass inside an airbag module (10), wherein a continuous securing ring (50)

is provided for securing to the gas generator (14), the securing ring (50) being provided with at least one axially oriented damping member (78, 80, 82, 84) that is arranged on an underside (76) of the securing ring (50), the securing ring (50) comprising a U-profile (103), the U-profile (103) having a first leg (104), on which a flange (32) of the gas generator (14) rests, that is longer than a second leg (105) of the U-profile (103).

26. A device (18) for securing a gas generator (14) in an oscillating manner as a vibration-absorbing mass inside an airbag module (10), wherein a continuous securing ring (50) is provided for securing to the gas generator (14), the securing ring (50) being provided with at least one axially oriented damping member (78, 80, 82, 84) that is arranged on an underside (76) of the securing ring (50), and with a positioning nipple (101) that is arranged on an upper side (66) of the securing ring (50) so that the positioning nipple (101) can interact with a recess (102) or an opening of the gas generator (14) for fixing a relative position between the gas generator (14) and the securing ring (50).

* * * * *